Nov. 3, 1925.  1,560,068
E. E. McCOLLUM
METHOD OF GENERATING GEARS
Filed Sept. 2, 1921
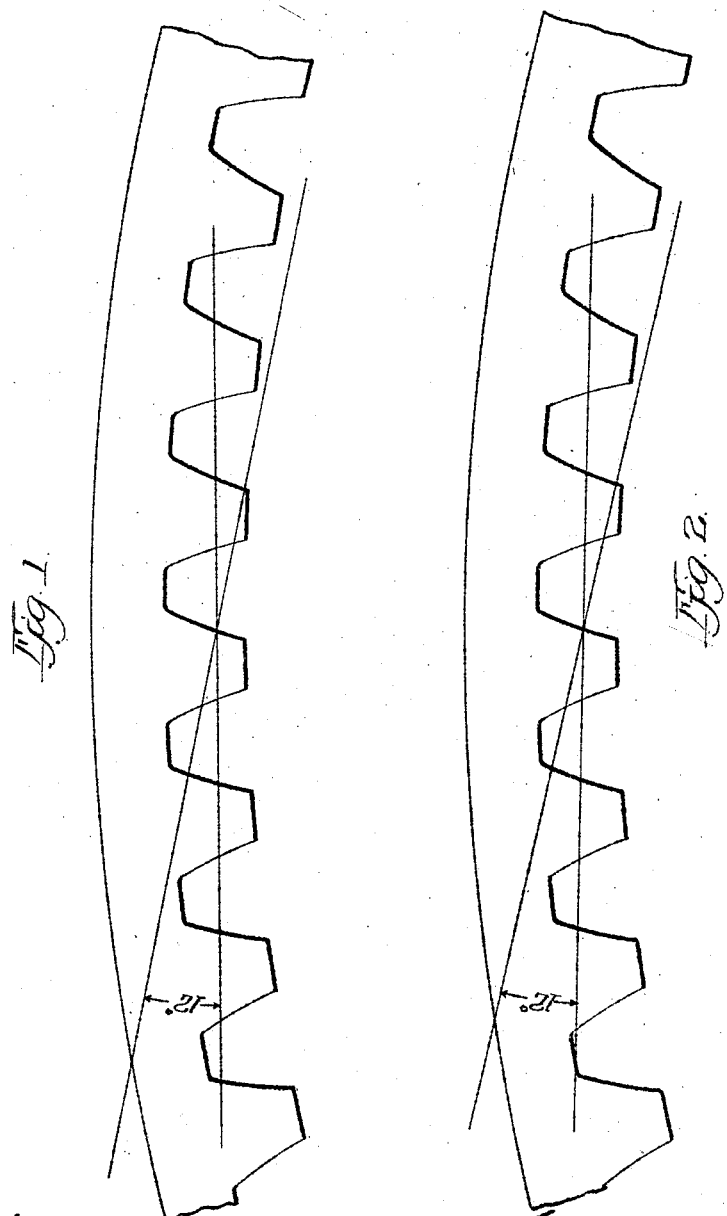

Patented Nov. 3, 1925.

1,560,068

UNITED STATES PATENT OFFICE.

EARL E. McCOLLUM, OF DOWNERS GROVE, ILLINOIS.

METHOD OF GENERATING GEARS.

Application filed September 2, 1921. Serial No. 497,999.

*To all whom it may concern:*

Be it known that I, EARL E. McCOLLUM, a citizen of the United States, and resident of Downers Grove, in the county of Du Page and State of Illinois, have invented certain new and useful Improvements in a Method of Generating Gears, of which the following is a specification.

My invention relates to a method of generating gears and particularly to a method of manufacturing bastard internal gears.

It is customary in many instances, particularly in the manufacture of hoists or other speed reducing devices, to utilize gears having the same pitch diameter as that of a standard gear but having a greater or less number of teeth. My improvement relates to a method of generating such gears the particular object being to provide an internal gear adapted to be mounted alongside of a standard gear of the same pitch diameter, the two gears being engaged by a standard toothed pinion. The fact that one of the gears has a greater or less number of teeth than the other will cause relative angular movement between the two gears. However, great difficulty has been experienced in so forming the bastard gear as to enable it to properly mesh without backlash or frictional loss and to provide for the requisite clearance.

The desired result is secured by generating the standard gear and the pinion intended to mesh therewith and with the bastard gear, with the teeth at a 12° angle of obliquity; then generating the bastard gear with the same pitch circle by employing a gear cutter which is a duplicate of the pinion intended to mesh therewith. By this means a bastard gear is produced, the teeth of which are almost identical with those of the standard gear and which will operate satisfactorily with a standard gear. I am aware that it is not new to generate standard gears with a 12° angle of obliquity, but it is new to generate a bastard gear by employing a cutter which is a duplicate, so far as the cutting outline is concerned, of the 12° tooth pinion. Furthermore, I increase the inside diameter of the blank from which the gear is cut. It is common practice to find the outside diameter of a gear blank by adding two of the pitches to the pitch diameter; that is, if the pitch is 16, ⅛th of an inch is added to the pitch diameter. In the case of an internal gear, ⅛th of an inch is subtracted from the pitch diameter to obtain the inside diameter of the blank. I do not find the inside diameter of the blank by subtracting two of the pitches but make the inside diameter somewhat greater. This serves to eliminate the pronounced pointing of the bastard teeth.

In the accompanying drawing I have shown two views illustrating standard and bastard gears respectively.

Fig. 1 shows a portion of an internal gear with standard cut teeth, and,

Fig. 2 is a similar view showing bastard teeth.

Referring now to the figures, the internal gear shown in Fig. 1 is a standard gear of known construction having 96 teeth, 16 pitch cut on a 6″ pitch diameter with 12° pressure angle. A part of the gear is shown in enlarged side view in Fig. 1. This gear has been produced by a standard cutter, which cutter may be of any size. As is well understood by those skilled in the art, a gear of this character is made by fastening the blank upon a rotatable plate, the blank being centered on the plate, and then the machine, which may be a Fellows gear shaper, is adjusted through the change gears, or the like, for indexing the blank for 96 teeth. With any standard cutter, for example, a 16 pitch cutter, the teeth of the ring gear are then cut by a reciprocating motion of the cutter and a simultaneous rotation thereof, as is well understood by those skilled in the art.

The gear shown in Fig. 1, therefore, is a standard gear in every respect. It could be cut with a cutter having 12 teeth or 24 teeth or any other number of teeth of the desired pitch, because it is a standard gear in all respects.

The gear shown in Fig. 2 has 99 teeth therein, but it is of the same pitch diameter, same pressure angle, and of a pitch which is approximately 16, but in fact is something slightly greater because it is not a standard gear but is a bastard gear. It has three teeth too many to be a standard gear. It is produced in the following manner, namely, a blank is centered upon the rotatable base plate of the gear shaper, the change gears of the shaper are now set for an indexing of 99 teeth. The cutter which is employed in the present case is a 16 tooth cutter because the two gears which are shown, namely, the gear of Fig. 1 and the gear of Fig. 2, are to cooperate with each other through a 16 tooth pinion, that is to say, in the finished machine a 16 tooth pinion will mesh with the gears of both Fig. 1 and Fig. 2.

Now, it is a requirement of the process of my invention that the cutter, for producing the bastard gear of Fig. 2, shall have the same number of teeth and the same profile as the finished pinion which is to co-operate with the two gears.

Whereas, the gear of Fig. 1 will mesh with any standard pinion of the same pitch and pressure angle, the teeth of the gear of Fig. 2 will not so mesh with any standard gear, but only with a standard gear of 16 teeth which is the same as the cutter which produced it.

By producing the bastard gear in this manner, namely, cutting it by means of a cutter which has the same number of teeth as the pinion with which it is to co-operate, I am able to secure as a result a peculiar relation between the standard gear of Fig. 1, the bastard gear of Fig. 2, and the co-operating pinion (not shown), to-wit, that they are in a hoist of the character described as self-locking, as previously mentioned. In the gears above described, when they are lined up on a common axis, it will be found that at three points 120° apart the teeth will accurately register and pinions may be placed at these points meshing with both gears and, as I have shown in my co-pending application, Serial No. 736,450, filed September 8, 1924, a plurality of pinions may, therefore, be meshed with both gears.

Obviously a different number of teeth and a different pitch and a different pressure angle may be employed, and likewise a different pinion may be employed, the number above given being merely for purposes of illustration, for example, instead of the 96 tooth standard gear and 99 tooth bastard gear co-operating with a 16 tooth pinion I may employ, as shown in my co-pending application, a 60 tooth standard internal gear and a bastard gear with 62 teeth cooperating with a 20 tooth pinion. The same fundamental principle is to be observed in each case, namely, that the standard gear may be produced by any standard cutter, but the bastard gear must be produced by a particular cutter, namely, one which is a duplicate of the pinion which is to be employed in connection with it and the standard gear. Obviously the standard gear may be cut by the same cutter as that which is employed to cut the bastard gear.

The teeth shown on these figures are laid out exactly to form and represent the contour of teeth generating in accordance with the directions herein. It will be noted that there is but little difference in the contour of the two sets of teeth and that they may be used interchangeably with a standard toothed pinion. By reason of extended experiments I am able to say that a gear generated in accordance with the practice here disclosed is satisfactory in every respect.

Wherever herein I have referred to a 12° angle of obliquity, I wish it to be understood that this need not be taken literally as some variations may be made without losing all of the advantages otherwise to be gained. It should be understood also that the amount of variation in the inside diameter of the blank is dependent upon the size of the gear to be cut and the pitch thereof and will be determined by experiment.

I claim:

1. The herein described method of making cooperating gears which consists in producing an internal gear and an intermeshing pinion of standard pitch, then generating a second internal gear of equal pitch diameter but of a different number of teeth by means of a cutter which is a duplicate of said standard pinion.

2. The method of producing a bastard internal gear for mesh with a standard tooth pinion which consists in preparing a blank of suitable dimensions, and then generating the teeth therein by means of a cutter which is a substantial duplicate of the said standard tooth pinion intended for use therewith.

3. The method of producing a bastard internal gear for mesh with a standard twelve degree tooth pinion which consists in preparing a blank of suitable dimensions, and then generating the teeth therein by means of a cutter which is a substantial duplicate of the said standard tooth pinion intended for use therewith.

4. The herein described method of making cooperating gears which consists in producing an internal gear and an intermeshing pinion of standard twelve degree angle, then generating a second internal gear of equal pitch diameter but of a different number of teeth by means of a cutter which is a duplicate of said standard pinion.

5. The method of producing a bastard internal gear for engagement with a standard tooth pinion which consists in preparing a blank having a slightly greater internal diameter than that of a blank for a standard tooth internal gear of the same pitch diameter as that of the bastard gear to be formed, then generating the teeth of said bastard gear by means of a cutter generating face of which is a substantial duplicate as to outline of the pinion intended for engagement with said bastard gear.

Signed at Chicago, Illinois, this 31st day of August, 1921.

EARL E. McCOLLUM.